United States Patent
Gustafsson

(10) Patent No.: US 10,836,628 B2
(45) Date of Patent: Nov. 17, 2020

(54) FLUID DISPENSING UNIT HAVING A DEFROSTING SYSTEM

(71) Applicant: Wayne Fueling Systems LLC, Austin, TX (US)

(72) Inventor: Gustaf Gustafsson, Glemmingebro (SE)

(73) Assignee: Wayne Fueling Systems LLC, Austin, TX (US)

(*) Notice: Subject to any disclaimer, the term of this patent is extended or adjusted under 35 U.S.C. 154(b) by 0 days.

(21) Appl. No.: 16/405,232

(22) Filed: May 7, 2019

(65) Prior Publication Data

US 2019/0345022 A1 Nov. 14, 2019

Related U.S. Application Data

(60) Provisional application No. 62/669,083, filed on May 9, 2018.

(51) Int. Cl.
*B67D 7/02* (2010.01)
*B67D 7/82* (2010.01)

(52) U.S. Cl.
CPC ............... *B67D 7/82* (2013.01); *B67D 7/02* (2013.01)

(58) Field of Classification Search
CPC ..................................... B67D 7/02; B67D 7/82
USPC ............................................. 222/146.2, 146.5
See application file for complete search history.

(56) References Cited

U.S. PATENT DOCUMENTS

| | | | | |
|---|---|---|---|---|
| 4,060,366 A | * | 11/1977 | Johansson | B26F 1/0015 425/290 |
| 4,915,828 A | * | 4/1990 | Meyers | A01K 63/045 210/110 |
| 5,881,699 A | * | 3/1999 | Brown | B01D 35/0273 123/514 |
| 5,988,435 A | * | 11/1999 | Edwards | B67D 7/02 222/1 |
| 6,517,724 B1 | * | 2/2003 | Malone | C02F 3/06 210/151 |
| 7,658,891 B1 | * | 2/2010 | Barnes | A61L 9/015 128/205.28 |
| 9,038,856 B2 | * | 5/2015 | Larsson | B67D 7/62 222/74 |
| 2006/0180546 A1 | | 8/2006 | Stuth et al. | |
| 2012/0024892 A1 | | 2/2012 | Bartlett et al. | |
| 2015/0291412 A1 | | 10/2015 | Larsson | |
| 2015/0300551 A1 | | 10/2015 | Shelton et al. | |
| 2019/0345022 A1 | * | 11/2019 | Gustafsson | B67D 7/84 |

FOREIGN PATENT DOCUMENTS

WO 9744274 A1 11/1997

* cited by examiner

*Primary Examiner* — Paul R Durand
*Assistant Examiner* — Andrew P Bainbridge
(74) *Attorney, Agent, or Firm* — Mintz Levin Cohn Ferris Glovsky and Popeo, P.C.

(57) ABSTRACT

Various fluid dispensing units having a defrosting system and methods for using the same are provided. In general, a fluid dispensing unit configured to dispense fluid such as AUS32 therefrom is configured to circulate the fluid when the fluid dispensing unit is not in use, e.g., is not dispensing the fluid, to help prevent the fluid from freezing or beginning to crystallize. In the event that the fluid freezes or begins to crystallize, such as due to a power failure that prevents the fluid from circulating, the fluid dispensing unit has a defrosting system configured to heat the frozen or crystallized fluid.

20 Claims, 3 Drawing Sheets

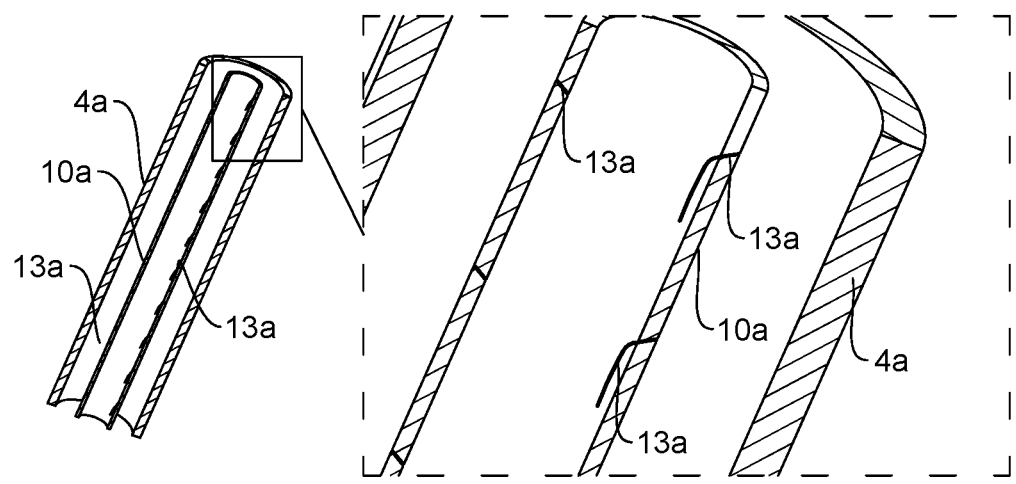
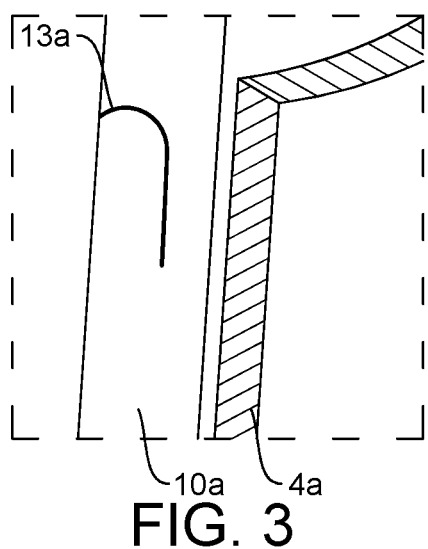
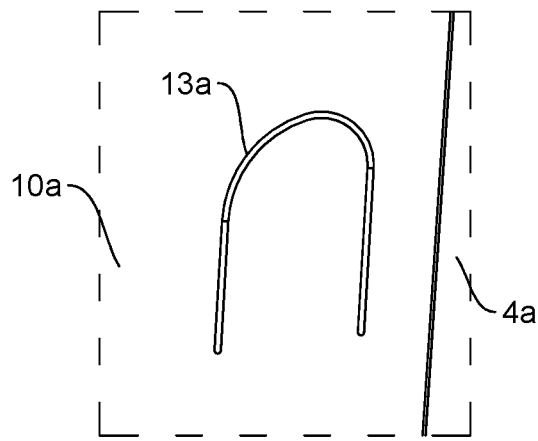
FIG. 2
FIG. 3
FIG. 4

FLUID DISPENSING UNIT HAVING A DEFROSTING SYSTEM

CROSS-REFERENCE TO RELATED APPLICATION

The present application claims priority to U.S. Provisional Application No. 62/669,083, filed on May 9, 2018 in the U.S. Patent and Trademark Office, the entire disclosure of which is hereby incorporated by reference.

FIELD

The present disclosure relates generally to a fluid dispensing unit having a defrosting system.

BACKGROUND

Today, diesel powered vehicles account for large emissions of nitrogen oxides, generally referred to as $NO_x$. The $NO_x$ emissions are harmful to the environment. One technique used to reduce the amount of harmful $NO_x$ emissions is selective catalytic reduction (SCR). The basic idea of SCR is to convert $NO_x$ into harmless diatomic nitrogen ($N_2$) and water ($H_2O$). The reaction is enabled using a reductant which is added onto a catalyst. Several reductants may be used such as anhydrous ammonia, aqueous ammonia, or urea.

A standard has been established for using a SCR reductant in diesel powered vehicles. The reductant used is an aqueous urea solution having a urea concentration of 32.5%. The solution is referred to as AUS32. In order to obtain the correct concentration the urea is mixed with demineralized water. When the diesel engine is running AUS32 is added into the exhaust flow, before or in the catalytic converter, by an amount corresponding to 3-5% of the diesel consumption. When AUS32 is added to the exhaust flow of a diesel engine, the engine can be operated more intensely without generating more $NO_x$ emissions. In Europe AUS32 is generally sold under the trade mark of AdBlue®, and in North America AUS32 is referred to as Diesel Exhaust Fluid (DEF). AUS32 is commonly available at service stations throughout the world. Various kinds of dispensers are used in order to refill AUS32 in the intended tanks of diesel powered vehicles.

There are, however, problems related to the refilling and storing of AUS32. For example, AUS32 fluid will easily crystallize when subjected to air, e.g., when dried out. This implies that crystals will begin to build up at nozzles and other parts of the dispensers that are not tightly sealed from air. This means in practice that clogging results, leading to a reduced flow.

For another example, a problem encountered in dispensers for AUS32 is crystallization by freezing of the fluid. The AUS32 fluid will begin to crystallize at about −7° C., forming a slush. At about −11° C. the fluid will freeze and form a solid. A common solution used to counteract the fluid from freezing is to place all parts of the dispenser subjected to the fluid in a controlled heated environment. This solution makes the refilling considerably more complicated for the user, since the refilling hose and nozzle must in practice be placed in a heated cabinet or similar. During a refilling process the user must thus open the cabinet before being able to refill the AUS32 tank of his/her vehicle. Once finished the user must close the cabinet in order to not risk that the fluid in the refilling hose will freeze. If the cabinet is not sufficiently closed after a refilling process the fluid in the refilling hose and nozzle might freeze, leaving the dispenser useless for the next user. The use of heated cabinets also consumes considerable energy, particularly when the cabinet is not sufficiently closed after a refilling process.

Accordingly, there remains a need for improved fluid dispensing units.

SUMMARY

In general, fluid dispensing units having a defrosting system and methods for using the same are provided.

In one aspect, a fluid dispensing unit is provided that in one embodiment includes a fluid hose configured to pass fluid therethrough. The fluid hose has a proximal end and a distal end. The fluid dispensing unit also includes a nozzle connected to the distal end of the fluid hose and configured to dispense fluid from the fluid dispensing unit to a vehicle, a heating element, an inner fluid reservoir configured to be heated by the heating element, a first fluid conduit, a second fluid conduit, and a pump configured to circulate fluid from the inner fluid reservoir toward the first fluid conduit. The first fluid conduit extends from the inner fluid reservoir to the proximal end of the fluid hose, has a portion extending through the fluid hose, has a perforated portion in the portion extending through the fluid hose, and has a distal opening within the fluid hose and proximal to the nozzle. The second fluid conduit is in fluid communication with the fluid hose at the proximal end of the fluid hose at one end of the second fluid conduit and is connected to the inner fluid reservoir at the other end of the second fluid conduit.

The fluid dispensing unit can have any number of variations. For example, the pump can be configured to circulate fluid from the inner fluid reservoir, through the first fluid conduit, out of the perforated portion and out of the distal opening of the first fluid conduit, into and back through the fluid hose, to the second fluid conduit, and back into the inner fluid reservoir.

For another example, the first fluid conduit can be perforated by including a plurality of openings along a longitudinal direction of the first fluid conduit. In at least some embodiments, the openings can be spaced apart by a predetermined distance, and/or at least one of the plurality of openings is located near the proximal end of the fluid hose. In at least some embodiments, the predetermined distance can be varied along the longitudinal direction of the first fluid conduit. A size of the openings can be increasing along the first fluid conduit in a direction towards the nozzle. The plurality of openings can each have a geometry such that a pressure required to open each opening decreases for each opening in a direction towards the nozzle. The plurality of openings can each have a geometry to prevent fluid flowing downstream from entering an upstream flow path.

For yet another example, the pump can be driven by a motor, and the motor can be connected to the pump with a magnetic coupling.

For another example, the fluid dispensing unit can include a relief valve connected to the first fluid conduit at the proximal end of the fluid hose.

For still another example, the fluid dispensing unit can include a hose connection connecting the second fluid conduit and the fluid hose.

For another example, the heating element can be in communication with the inner fluid reservoir.

For yet another example, the inner reservoir can be constituted by a portion of the fluid hose.

For another example, the fluid can include AUS32.

In another embodiment, a fluid dispensing unit includes a hose having a first fluid passageway extending therealong. The first fluid passageway is configured to pass fluid to a nozzle. The fluid dispensing unit also includes a first fluid conduit disposed in the hose and having a second fluid passageway extending therealong. The first fluid conduit has a distal opening at a distal end thereof, the first fluid conduit has a plurality of side openings formed in a sidewall thereof, and the distal opening and each of the side openings are in fluid communication with the first and second fluid passageways. The fluid dispensing unit also includes a heating element and a fluid reservoir configured to be heated by the heating element. The first fluid conduit is in fluid communication with the fluid reservoir. The fluid dispensing unit also includes a pump configured to pump fluid from the fluid reservoir into the first fluid conduit.

The fluid dispensing unit can vary in any number of ways. For example, the second fluid passageway can be coaxial with the first fluid passageway. For another example, the side openings can be longitudinally arranged along a longitudinal length of the first fluid conduit. For yet another example, the side openings can be pressure sensitive such that the side openings are closed until a pressure of fluid in the second fluid passageway exceeds a predetermined pressure. For still another example, a size of the side openings can be increasing along the first fluid conduit in a distal direction. For another example, the pump can be configured to pump fluid from the fluid reservoir, then through the second fluid passageway, then into the first fluid passageway through at least one of the side openings and the distal opening, and then back into the fluid reservoir.

For yet another example, the fluid dispensing unit can also include a second fluid conduit in fluid communication with the fluid hose and with the fluid reservoir such that the second fluid conduit is configured to allow fluid to pass from the hose and into the fluid reservoir. In at least some embodiments, a distal end of the second fluid conduit can be connected to a proximal end of the hose and a proximal end of the second fluid conduit can be connected to the fluid reservoir, and/or the pump can be configured to pump fluid from the fluid reservoir, through the second fluid passageway, then into the first fluid passageway through at least one of the side openings and the distal opening, then into the second fluid conduit, and then back into the fluid reservoir.

For another example, the distal opening of the first fluid conduit can be located proximal to a distal opening of the hose configured to pass the fluid to the nozzle.

For still another example, the fluid dispensing unit can also include a temperature sensor, and a control unit configured to selectively activate and deactivate the pump based on a temperature sensed by the temperature sensor. In at least some embodiments, the control unit can be configured to activate the pump in response to the temperature sensed by the temperature sensor being below a predetermined threshold temperature and can be configured to deactivate the pump in response to the temperature sensed by the temperature sensor being above the predetermined threshold temperature.

For yet another example, the fluid dispensing unit can also include a control unit configured to activate and deactivate the pump according to a predetermined schedule. For another example, the fluid dispensing unit can also include a motor configured to drive the pump, and the motor can be connected to the pump with a magnetic coupling. For yet another example, the fluid dispensing unit can also include a relief valve connected to the first fluid conduit at a proximal end of the hose. For still another example, the fluid dispensing unit can also include the nozzle, and the nozzle can be connected to a distal end of the hose and can be configured to dispense fluid from the fluid dispensing unit to a vehicle. For another example, the fluid can include AUS32.

In another embodiment, a fluid dispensing unit includes a hose having a first fluid passageway extending therealong. The first fluid passageway is configured to receive fluid from a fluid tank and to pass the received fluid to a nozzle. The fluid dispensing unit also includes a first fluid conduit having a second fluid passageway extending therealong. The first fluid conduit has a plurality of openings each in fluid communication with the first and second fluid passageways. The fluid dispensing unit also includes a second fluid conduit having a third fluid passageway extending therealong. The third fluid passageway is configured to receive fluid from the first fluid passageway. The fluid dispensing unit also includes a fluid reservoir configured to contain fluid therein. The second fluid passageway is configured to receive fluid from the fluid reservoir, and the third fluid passageway is configured to pass to the fluid reservoir the fluid received from the first fluid passageway. The fluid dispensing unit also includes a pump configured to pump fluid from the fluid reservoir into the second fluid passageway such that the fluid passes through the plurality of openings and into the first fluid passageway, then from the first fluid passageway into the third fluid passageway, and then from the third fluid passageway into the fluid reservoir.

The fluid dispensing unit can have any number of variations. For example, the fluid dispensing unit can also include a heating element configured to heat the fluid in the fluid reservoir such that the fluid pumped from the fluid reservoir into the second fluid passageway is heated fluid. For another example, the second fluid passageway can be coaxial with the first fluid passageway.

For yet another example, the plurality of openings can include an opening at a distal end of the first fluid conduit, the plurality of openings can include a plurality of side openings formed in a sidewall of the first fluid conduit, and the plurality of side openings can be longitudinally arranged along a longitudinal length of the first fluid conduit. In at least some embodiments, the side openings can be pressure sensitive such that the side openings are closed until a pressure of fluid in the second fluid passageway exceeds a predetermined pressure, and/or a size of the side openings can be increasing along the first fluid conduit in a distal direction.

For another example, a distal end of the second fluid conduit can be connected to a proximal end of the hose, and a proximal end of the second fluid conduit can be connected to the fluid reservoir.

For still another example, the fluid dispensing unit can also include a temperature sensor, and a control unit configured to selectively activate and deactivate the pump based on a temperature sensed by the temperature sensor. In at least some embodiments, the control unit can be configured to activate the pump in response to the temperature sensed by the temperature sensor being below a predetermined threshold temperature and can be configured to deactivate the pump in response to the temperature sensed by the temperature sensor being above the predetermined threshold temperature.

For yet another example, the fluid dispensing unit can also include a control unit configured to activate and deactivate the pump according to a predetermined schedule. For another example, the fluid dispensing unit can also include a motor configured to drive the pump, and the motor can be connected to the pump with a magnetic coupling. For yet another example, the fluid dispensing unit can also include a relief valve connected to the first fluid conduit at a proximal end of the hose. For still another example, the fluid dispensing unit can also include the nozzle, and the nozzle can be connected to a distal end of the hose and can be configured to dispense fluid from the fluid dispensing unit to a vehicle. For another example, the fluid can include AUS32.

In another aspect, a fluid dispensing method is provided that in one embodiment includes heating a fluid in a fluid reservoir in a fluid dispensing unit. The fluid dispensing unit includes a hose, a first fluid conduit having a plurality of openings including a distal end opening and a plurality of side openings formed in a sidewall of the first fluid conduit, and a second fluid conduit. The fluid dispensing method also includes pumping the heated fluid in a distal direction from the fluid reservoir into fluid path of the first fluid conduit such that the fluid passes through at least one of the plurality of openings and into a fluid path of the hose that is coaxial with the fluid path of the first fluid conduit, the fluid then travels in a proximal direction in the fluid path of the hose and into a fluid path of the second fluid conduit, and the fluid then travels in the fluid path of the second conduit and back into the fluid reservoir.

The fluid dispensing method can vary in any number of ways. For example, the plurality of side openings can be pressure sensitive such that the plurality of side openings are closed until a pressure of fluid in the fluid path of the first fluid conduit exceeds a predetermined pressure. For yet another example, a size of the plurality of side openings can be increasing along the first fluid conduit in a distal direction. For still another example, a distal end of the second fluid conduit can be connected to a proximal end of the hose, and a proximal end of the second fluid conduit can be connected to the fluid reservoir.

For another example, the pumping can begin in response to a temperature sensor sensing a temperature below a predetermined threshold temperature. In at least some embodiments, the fluid dispensing method can also include stopping the pumping in response to the temperature sensed by the temperature sensor being above the predetermined threshold temperature.

For yet another example, the pumping can begin in accordance with a predetermined schedule of pumping.

For still another example, the fluid dispensing method can include preventing the pumping from occurring when all of the fluid is frozen in the fluid path of the hose and the fluid path of the first fluid conduit. In at least some embodiments, the fluid dispensing unit can include a magnetic coupling between a pump of the fluid dispensing unit and a motor of the fluid dispensing unit that drives the pump.

For yet another example, the fluid dispensing method can include preventing the pumping from occurring when the fluid is frozen in at least a distal portion of the fluid path of the first fluid conduit. In at least some embodiments, the fluid dispensing unit can include a relief valve connected to the first fluid conduit at a proximal end of the hose.

For still another example, the fluid can include AUS32.

DESCRIPTION OF DRAWINGS

This invention will be more fully understood from the following detailed description taken in conjunction with the accompanying drawings, in which:

FIG. 2 is a perspective view of a portion of another embodiment of a fluid dispensing unit;

FIG. 3 is another perspective view of a portion of the fluid dispensing unit of FIG. 2;

FIG. 4 is yet another perspective view of a portion of the fluid dispensing unit of FIG. 2.

DETAILED DESCRIPTION

Figure 1:
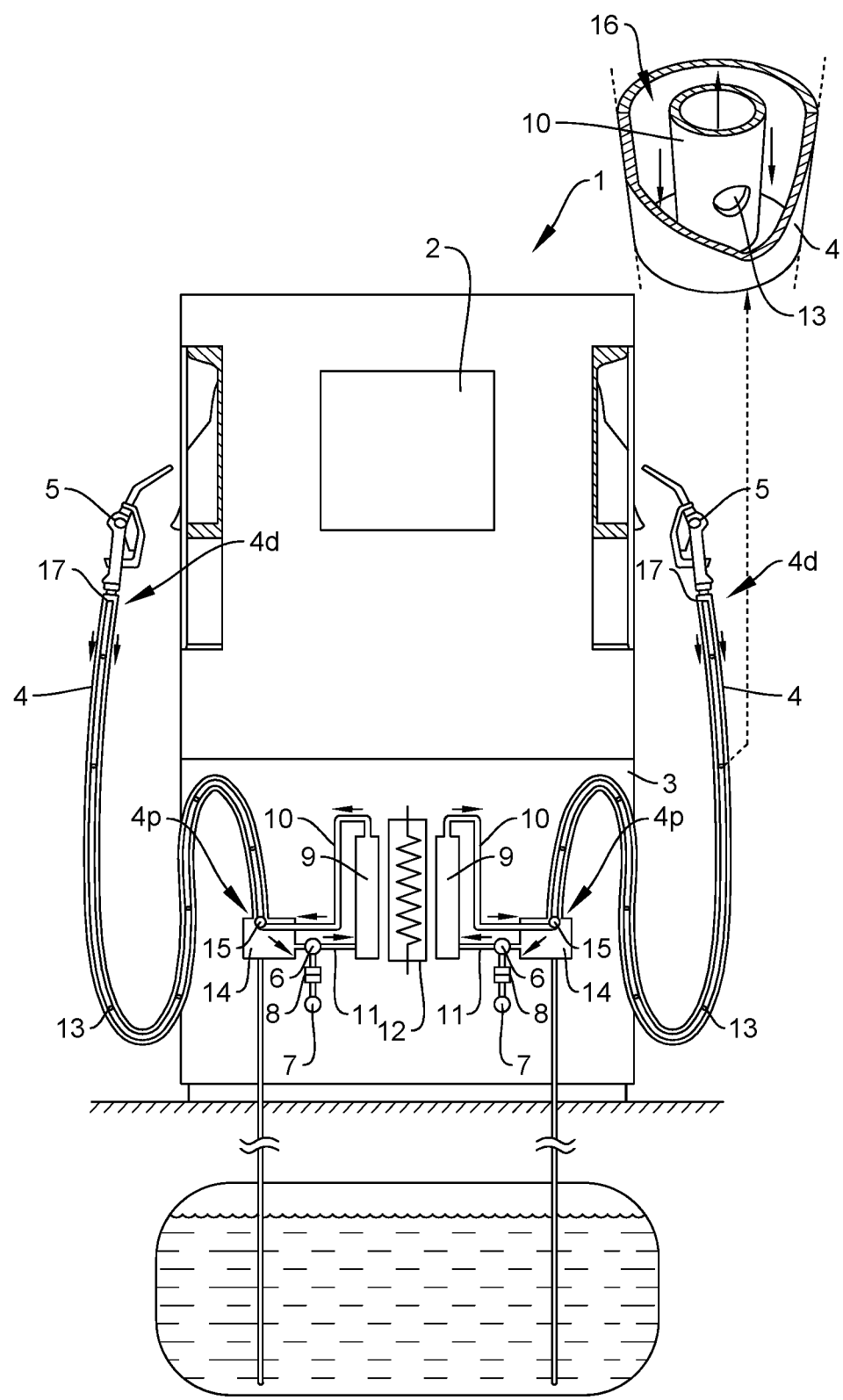
FIG. 1 is a schematic view of one embodiment of a fluid dispensing unit having a defrosting system.

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various fluid dispensing units having a defrosting system and methods for using the same are provided. In general, a fluid dispensing unit configured to dispense fluid, such as AUS32, therefrom is configured to circulate the fluid when the fluid dispensing unit is not in use, e.g., is not dispensing the fluid, to help prevent the fluid from freezing or beginning to crystallize. In the event that the fluid freezes or begins to crystallize, such as due to a power failure that prevents the fluid from circulating, the fluid dispensing unit has a defrosting system configured to heat the fluid. The fluid dispensing unit can therefore be configured to remain in a constant state in which fluid can be non-frozen and thus be dispensable from the fluid dispensing unit.

In an exemplary embodiment, a fluid dispensing unit can be configured to, during normal circumstances, e.g., when no fluid in the fluid dispensing unit is frozen, circulate fluid internally when the fluid dispensing unit is not in use. Using a pump of the fluid dispensing unit that is driven by a motor, the fluid is circulated from an inner fluid reservoir of the fluid dispensing unit, through a first fluid conduit of the fluid dispensing unit, out of a perforated portion of the fluid dispensing unit and out of a distal opening of the first fluid conduit, into and back through a fluid hose of the fluid dispensing unit, to a second fluid conduit of the fluid dispensing unit, and back into the inner fluid reservoir. Such a circulation is conducted in order to prevent the fluid from freezing when the fluid dispensing unit is placed in a cold climate geographic area or otherwise subjected to a cold temperature sufficient to freeze the fluid. Should the fluid in the fluid dispensing unit freeze anyway, no fluid circulation will be possible when the fluid in the first fluid conduit and the fluid hose is frozen. Circulation can begin before the entire fluid hose is defrosted, e.g., before fluid can circulate through the entire hose, which may accelerate the defrosting process. The fluid dispensing unit is configured to start the circulation of the fluid as soon as the fluid up to a first perforation of the perforated portion in the first fluid conduit has been defrosted. The fluid may be circulated from the inner fluid reservoir, through the first fluid conduit, up to and out of a first or proximal-most perforation of the perforated portion of the first fluid conduit, into and back through the fluid hose, to the second fluid conduit, and back into the inner fluid reservoir. When a second or second-proximal-most perforation of the perforated portion of the first fluid conduit is reached, the corresponding circulation may be conducted up to and out of the second perforation and so on until the entire fluid hose has been defrosted. Further, since the fluid being circulated is heated by a heating element of the fluid dispensing unit, the defrosting process may be accelerated.

FIG. 1 illustrates one embodiment of a fluid dispensing unit 1 having a defrosting system. The fluid dispensing unit 1 is divided into an electronics compartment 2 and a hydraulics compartment 3. The fluid dispensing unit 1 has on each side thereof a fluid hose 4 which is configured to pass fluid therethrough. The fluid dispensing unit 1 can include another number of fluid hoses. A nozzle 5 is connected to a distal end 4d of the fluid hose 4 and is configured to dispense fluid from the fluid dispensing unit 1, e.g., dispense the fluid to a vehicle. The fluid dispensing unit 1 also includes on each side associated with each of the fluid hose 4 and nozzle 5 pairs a pump 6 and a motor 7 which is connected to the pump 6 via a magnetic coupling 8. Various embodiments of circulating fluid in a fluid dispensing unit using a pump are further described in U.S. Pat. No. 9,038, 856 entitled "Fluid Dispensing Unit Having A Circulation System And A Method For Circulating A Fluid In A Fluid Dispensing Unit" issued May 26, 2015, which is hereby incorporated by reference in its entirety.

The fluid dispensing unit 1 also includes a defrosting system. During normal circumstances, e.g., when no fluid in the fluid dispensing unit 1 is frozen, the defrosting system is used to circulate the fluid when the fluid dispensing unit 1 is not in use, e.g., when the fluid dispensing unit 1 is not dispensing fluid therefrom. Should the fluid, however, freeze in the fluid dispensing unit 1, e.g., due to a power failure, the defrosting system is used to accelerate defrosting of the fluid. In this illustrated embodiment, the defrosting system includes on each side associated with each of the fluid hose 4 and nozzle 5 pairs an inner fluid reservoir 9, a first fluid conduit 10, and a second fluid conduit 11. The first fluid conduit 10 extends from the inner fluid reservoir 9 to a proximal end 4p of the fluid hose 4 and coaxially through the fluid hose 4 to define an annular fluid path or passageway 16 within the hose 4 between an inner wall of the fluid hose 4 and an outer wall of the first fluid conduit 10. The second fluid conduit 11 is connected to the fluid hose 4 via a hose connection 14 at the proximal end 4p of the fluid hose 4 at one end of the second fluid conduit 11, and the second fluid conduit 11 is connected to the inner fluid reservoir 9 at the other end of the second fluid conduit 11. The first fluid conduit 10 has an outlet opening 17 within the fluid hose 4 proximal to the nozzle 5, proximal to the distal end 4d of the hose 4, and at a distal end of the first fluid conduit 10. This way, the fluid can be circulated, using the pump 6, from the inner fluid reservoir 9, through the first fluid conduit 10, out of the outlet opening 17 of the first fluid conduit 10, into and back through the fluid hose 4, to the second fluid conduit 11, and back into the inner fluid reservoir 9.

The defrosting system of the fluid dispensing unit 1 also includes a heating element 12. A single heating element 12 is used, which may help save energy, although in other embodiments multiple heating element may be used. The heating element 12 is in communication with the inner fluid reservoir 9 so as to be configured to heat fluid contained in the inner fluid reservoir 9. The heating element 12 can have a variety of configurations, as will be appreciated by a person skilled in the art. In this illustrated embodiment, the heating element 12 includes a heat coil.

The first fluid conduit 10 is perforated in the portion thereof extending coaxially through the fluid hose 4. The first fluid conduit 10 is non-perforated elsewhere along its longitudinal length. The perforated portion of the first fluid conduit 10 includes a plurality of openings 13 that are spaced apart by a predetermined distance. The openings 13 are configured to allow fluid to pass between the fluid passageways of the first fluid conduit 10 and the fluid hose 4, as shown in the inset of FIG. 1. In this illustrated embodiment the predetermined distance between each of the openings 13 is the same along the first fluid conduit's longitudinal length, e.g., along a longitudinal or extension direction of the first fluid conduit 10, but the predetermined distance can be different for different first fluid conduits in order to adapt the defrosting system of the fluid dispensing unit 1 to different climate types. If the climate where the fluid dispensing unit 1 is placed is extremely cold, the openings 13 can be closer to each other compared to when the fluid dispensing unit 1 is placed in a warmer climate zone. In other embodiments, the predetermined distance between each of the openings 13 can differ along the first fluid conduit's longitudinal length. For example, the predetermined distance can be progressively greater in a distal direction, e.g., the distance between the first opening 13, which is the opening 13 closest to the inner fluid reservoir 9, and the second opening 13, which is the opening 13 second closest to the inner fluid reservoir 9, can be less than the distance between the second opening 13 and the third opening 13, which is the opening 13 third closest to the inner fluid reservoir 9, and so on to the distal-most opening 13. The distance between openings 13 being smaller toward the proximal end of the first fluid conduit 10 may allow for more circulation to happen more quickly since the fluid is heated from the proximal end of the first fluid conduit 10, which is the end of the first fluid conduit 10 closest to the inner fluid reservoir 9.

No circulation will be possible when all of the fluid in the first fluid conduit 10 and the fluid hose 4 is frozen. However, the defrosting system is configured to allow the circulation of the fluid to start as soon as the fluid up to the first opening 13 of the perforated portion of the first fluid conduit 10, which is the opening 13 closest to the inner fluid reservoir 9, is defrosted. The fluid can be circulated from the inner fluid reservoir 9, through the first fluid conduit 10, up to and out of the first opening 13 of the first fluid conduit 10, into and back through the fluid hose 4, to the second fluid conduit 11, and back into the inner fluid reservoir 9. When the second opening 13 of the perforated portion of the first fluid conduit 10 is reached, the circulation can be conducted up to and out of the second opening 13 of the first fluid conduit 10 and so on for each successive opening 13 along the first fluid conduit's length until the entire fluid hose 4 has been defrosted. Since the fluid being circulated is heated by the heating element 12, the defrosting process will be even further accelerated as compared to circulation alone.

The openings 13 in the perforated portion of the first fluid conduit 10 can have any suitable size and shape. In this illustrated embodiment, the openings 13 are each circular openings. A size, e.g., diameter, of each of the openings 13 is the same in this illustrated embodiment, but the size of the openings 13 can increase for each opening 13 in a direction towards the nozzle 5, e.g., the first opening 13 has a diameter less than the diameter of the second opening 13, the diameter of the second opening 13 is less than the diameter of the third opening 13, etc. The sizes of the openings 13 being successively greater in a distal direction along the first fluid conduit's longitudinal length may allow substantially the same fluid pressure out of the openings 13 to be maintained throughout the entire first fluid conduit 10.

FIGS. 2-4 illustrate another embodiment of a fluid hose 4a and a first fluid conduit 10a in which each of a plurality of openings 13a of a perforated portion of the first fluid conduit 10a have a U-shape. The curved portion of the U-shape faces the distal ends of the fluid hose 4a and first fluid conduit 10a, and the opposed legs of the U-shape face the proximal ends of the fluid hose 4a and first fluid conduit 10a. The openings 13a are each a same size in this illustrated embodiment, but as mentioned above, sizes of the openings 13a can vary along the longitudinal length of the first fluid conduit 14a, e.g., each of the U-shapes can be successively larger in a distal direction along the first fluid conduit 14a.

Each of a first fluid conduit's openings can be pressure-sensitive to help ensure a satisfactory circulation of the fluid through the first fluid conduit during normal circumstances. The openings 13a of FIGS. 2-4 are one embodiment of pressure-sensitive openings that define flaps. The openings 13a are cuts in the first fluid conduit 10a that are cut transversely, e.g., non-perpendicularly, to the first fluid conduit's longitudinal axis. The transverse angle of the cuts allow the flaps to move outward but not inward to allow fluid to flow out of the first fluid conduit 10a and into the fluid hose 4a through the openings 13a.

Pressure-sensitive openings in the first fluid conduit are configured to prevent fluid from flowing therethrough from the first fluid conduit to the fluid hose when pressure of the fluid is below a threshold pressure value and to allow the fluid to flow therethrough from the first fluid conduit to the fluid hose when pressure of the fluid is above the threshold pressure value. In this way, during normal circumstances no fluid will pass through the openings, and during defrosting using the defrosting system fluid will pass through the openings. For example, the openings can be configured such that during normal circumstances when the fluid pressure is about 2 bars no fluid will be discharged through the openings, and during defrosting of the fluid hose using the defrosting system when the fluid pressure is raised to about 3 bars the fluid will be pressed out of the openings such that it can be circulated back to the inner reservoir. A pressure-sensitive opening can define a flap that, similar to a check value, is configured to be closed in normal circumstances, e.g., when the fluid pressure is below the threshold pressure value, and to open during defrosting, e.g., when the fluid pressure is above the threshold pressure value.

A fluid dispensing unit having openings of a first fluid conduit that are pressure sensitive allows the fluid dispensing unit to have a first or normal mode and a second or defrosting mode. In the first or normal mode, fluid is circulated within the fluid hose and first fluid conduit with the fluid able to pass through the first fluid conduit's distal opening, e.g., the distal opening 17 in FIG. 1, and unable to pass through any of the first fluid conduit's side openings, e.g., the openings 13 in FIG. 1. In the second or defrosting mode, fluid is circulated within the fluid hose and first fluid conduit with the fluid able to pass through the first fluid conduit's distal opening, e.g., the distal opening 17 in FIG. 1, and able to pass through the first fluid conduit's side openings, e.g., the openings 13 in FIG. 3. In the second or defrosting mode the fluid may not initially be able to pass through all of the first fluid conduit's distal opening and side openings due to the fluid being at least partially frozen, but as the fluid is defrosted the fluid can pass through an increasing number of the first fluid conduit's distal opening and side openings until the fluid is fully defrosted and can pass through all of the first fluid conduit's distal opening and side openings. The fluid dispensing unit's nozzle is seated in the fluid dispensing unit's nozzle boot and is not in use in each of the first or normal mode and the second or defrosting mode.

Figure 5:
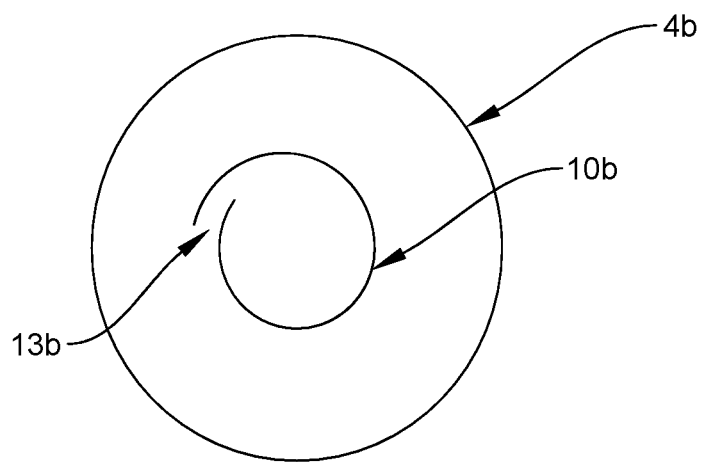
FIG. 5 is a cross-sectional view of a portion of another embodiment of a fluid dispensing unit.

FIG. 5 illustrates another embodiment of a fluid hose 4b and a first fluid conduit 10b having a cross-sectional C-shape. The first fluid conduit 10b has an opening 13b of a perforated portion thereof that extending longitudinally along the first fluid conduit's length and is pressure sensitive allows the fluid dispensing unit to have a first or normal mode and a second or defrosting mode similar to the first and second modes discussed above with respect to the embodiment of FIGS. 2-4. The first fluid conduit 10b is configured to flex in response to pressure to move between the first and second modes and either allow fluid within the first fluid conduit 10b to pass through the first fluid conduit's distal opening (first mode) or to pass through the side opening 13b (second mode).

Referring again to FIG. 1, the fluid dispensing unit 1 has safety features to help ensure that the components included in the defrosting system are not damaged when the fluid in the fluid dispensing unit 1 has frozen. One safety feature of the fluid dispensing unit 1 prevents the motor 7 from driving the pump 6 when all of the fluid is frozen in the first fluid conduit 10 and the hose 4, e.g., when circulation is not possible due to the fluid being frozen. The magnetic coupling 8 that connects the pump 6 and the motor 7 is configured to prevent the motor 7 from driving the pump 6 when the resistance from the same is too high, thereby helping to prevent the motor 7 from damaging the pump 6 when the fluid is frozen. The magnetic coupling 8 is configured to de-couple to allow the motor 7 to drive the pump 6 when at least some of the fluid is no longer frozen, e.g., due to increased ambient temperature, etc. Another safety feature of the fluid dispensing unit 1 prevents fluid from passing from the proximal portion of the first fluid conduit 10 that extends from the inner fluid reservoir 9 to the proximal end 4p of the fluid hose 4 to the distal portion of the first fluid conduit 10 that is coaxial with the fluid hose 4 when the fluid in the distal portion of the first fluid conduit 10 is frozen. The fluid dispensing unit 1 includes a relief valve 15 that is connected to the first fluid conduit 10 at the proximal end 4p of the fluid hose 4. The relief valve 15 is configured to prevent the fluid in the proximal portion of the first fluid conduit 10 from entering into the portion of the first conduit 10 that is extending coaxially through the fluid hose 4 when the fluid in the distal portion of the first fluid conduit 10 is frozen. Instead, the fluid will be circulated back to the inner reservoir 9 through the second fluid conduit 11.

The defrosting system can be temperature controlled. In other words, the defrosting system can be configured to be activated in response to a temperature being below a predetermined threshold temperature and to be deactivated in response to the temperature being above the predetermined threshold temperature. The defrosting system may therefore be configured to be automatically activated in response to a trigger event in the form of a sensed temperature. The predetermined threshold temperature can be, for example, about −11° C., which is the temperature at which AUS32 will freeze. For another example, the predetermined threshold temperature can be about −7° C., which is the temperature at which AUS32 will begin to crystallize. A person skilled in the art will appreciate that a value may not be precisely at a value but nevertheless be considered to be about that value due to any number of factors, such as sensitivity of measurement equipment. In one embodiment, the fluid dispensing unit 1 can include a control unit, e.g., a microcontroller, microprocessor, etc., operatively connected to the motor 7, operatively connected to a temperature sensor of the fluid dispensing unit 1, and operatively connected to a memory having the predetermined threshold temperature preprogrammed therein. In an exemplary embodiment, the temperature sensor is disposed in the hydraulics compartment 3. The control unit is configured to control the defrosting system based on the sensed temperature to selectively activate and deactivate the defrosting system, e.g., turn the motor 7 on when the sensed temperature is below the predetermined threshold temperature and to turn the motor 7 off when the sensed temperature is above the predetermined threshold temperature.

In addition to or as an alternative to the defrosting system being temperature controlled, the defrosting system can be configured to be activated and deactivated according to a predetermined schedule. The defrosting system being configured to be activated and deactivated according to a predetermined schedule may therefore be configured to be automatically activated on a regular basis to help prevent the fluid from freezing and to more quickly defrost frozen and/or crystallized fluid. The predetermined schedule can vary based on a location of the fluid dispensing unit 1 to adapt the defrosting system of the fluid dispensing unit 1 to different climate types. For example, the defrosting system can be configured to be activated more frequently, e.g., every half hour instead of every two hours, when the fluid dispensing unit 1 is in a colder climate area than when the fluid dispensing unit 1 is in a warmer climate area. The predetermined schedule can vary by season to reflect that temperatures are colder in some seasons, e.g., winter, than in other seasons, e.g., summer. The predetermined schedule can allow the defrosting system to remain activated for any of a variety of periods of time, e.g., five minutes, ten minutes, twelve minutes, etc., before being deactivated. In one embodiment, the fluid dispensing unit 1 can include a control unit, e.g., a microcontroller, microprocessor, etc., operatively connected to the motor 7 and operatively connected to a memory having the predetermined schedule preprogrammed therein. The control unit is configured to activate and deactivate the defrosting system according to the predetermined schedule, e.g., turn the motor 7 on at a predetermined time (e.g., thirty minutes since the motor 7 was last deactivated, one hour since the motor 7 was last activated, at the top of every hour, etc.) and to turn the motor 7 off after passage of a predetermined amount of time from the last activation of the motor 7.

The fluid dispensing unit 1 can include a fluid meter that measures the amount of fluid discharged from the fluid dispensing unit 1. When the fluid dispensing unit 1 has such a fluid meter and has the relief valve 15, the relief valve 15 should be placed downstream of the fluid meter. In an exemplary embodiment, the fluid meter is in the hydraulics compartment 3.

One skilled in the art will appreciate further features and advantages of the invention based on the above-described embodiments. For example, the size, shape, number, and placement of the components in the fluid dispensing unit may be varied in any suitable way. Accordingly, the invention is not to be limited by what has been particularly shown and described, except as indicated by the appended claims. All publications and references cited herein are expressly incorporated herein by reference in their entirety.

What is claimed is:

1. A fluid dispensing unit, comprising:
a fluid hose configured to pass fluid therethrough, the fluid hose having a proximal end and a distal end;
a nozzle connected to the distal end of the fluid hose and configured to dispense fluid from the fluid dispensing unit to a vehicle;
a heating element;
an inner fluid reservoir configured to be heated by the heating element;
a first fluid conduit extending from the inner fluid reservoir to the proximal end of the fluid hose and having a portion extending through the fluid hose, the first fluid conduit having a perforated portion in the portion extending through the fluid hose, and the first fluid conduit having a distal opening within the fluid hose and proximal to the nozzle;
a second fluid conduit in fluid communication with the fluid hose at the proximal end of the fluid hose at one end of the second fluid conduit and connected to the inner fluid reservoir at the other end of the second fluid conduit; and
a pump configured to circulate fluid from the inner fluid reservoir toward the first fluid conduit.

2. The fluid dispensing unit of claim 1, wherein the pump is configured to circulate fluid from the inner fluid reservoir, through the first fluid conduit, out of the perforated portion and out of the distal opening of the first fluid conduit, into and back through the fluid hose, to the second fluid conduit, and back into the inner fluid reservoir.

3. The fluid dispensing unit of claim 1, wherein the first fluid conduit is perforated by including a plurality of openings along a longitudinal direction of the first fluid conduit.

4. The fluid dispensing unit of claim 3, wherein a size of the openings is increasing along the first fluid conduit in a direction towards the nozzle.

5. The fluid dispensing unit of claim 3, wherein the plurality of openings each have a geometry such that a pressure required to open each opening decreases for each opening in a direction towards the nozzle.

6. The fluid dispensing unit of claim 3, wherein the plurality of openings each have a geometry to prevent fluid flowing downstream from entering an upstream flow path.

7. The fluid dispensing unit of claim 1, wherein the fluid includes AUS32.

8. A fluid dispensing unit, comprising:
a hose having a first fluid passageway extending therealong, the first fluid passageway being configured to pass fluid to a nozzle;
a first fluid conduit disposed in the hose and having a second fluid passageway extending therealong, the first fluid conduit having a distal opening at a distal end thereof and the first fluid conduit having a plurality of side openings formed in a sidewall thereof, the distal opening and each of the side openings being in fluid communication with the first and second fluid passageways;
a heating element;

a fluid reservoir configured to be heated by the heating element, the first fluid conduit being in fluid communication with the fluid reservoir; and a pump configured to pump fluid from the fluid reservoir into the first fluid conduit.

9. The fluid dispensing unit of claim 8, wherein the second fluid passageway is coaxial with the first fluid passageway.

10. The fluid dispensing unit of claim 8, wherein the side openings are longitudinally arranged along a longitudinal length of the first fluid conduit.

11. The fluid dispensing unit of claim 8, wherein the side openings are pressure sensitive such that the side openings are closed until a pressure of fluid in the second fluid passageway exceeds a predetermined pressure.

12. The fluid dispensing unit of claim 8, wherein a size of the side openings is increasing along the first fluid conduit in a distal direction.

13. The fluid dispensing unit of claim 8, wherein the pump is configured to pump fluid from the fluid reservoir, then through the second fluid passageway, then into the first fluid passageway through at least one of the side openings and the distal opening, and then back into the fluid reservoir.

14. The fluid dispensing unit of claim 8, further comprising a second fluid conduit in fluid communication with the fluid hose and with the fluid reservoir such that the second fluid conduit is configured to allow fluid to pass from the hose and into the fluid reservoir.

15. The fluid dispensing unit of claim 14, wherein the pump is configured to pump fluid from the fluid reservoir, through the second fluid passageway, then into the first fluid passageway through at least one of the side openings and the distal opening, then into the second fluid conduit, and then back into the fluid reservoir.

16. The fluid dispensing unit of claim 8, wherein the fluid includes AUS32.

17. A fluid dispensing method, comprising:

heating a fluid in a fluid reservoir in a fluid dispensing unit, the fluid dispensing unit including a hose, a first fluid conduit having a plurality of openings including a distal end opening and a plurality of side openings formed in a sidewall of the first fluid conduit, and a second fluid conduit; and pumping the heated fluid in a distal direction from the fluid reservoir into fluid path of the first fluid conduit such that the fluid passes through at least one of the plurality of openings and into a fluid path of the hose that is coaxial with the fluid path of the first fluid conduit, the fluid then travels in a proximal direction in the fluid path of the hose and into a fluid path of the second fluid conduit, and the fluid then travels in the fluid path of the second conduit and back into the fluid reservoir.

18. The method of claim 17, wherein the plurality of side openings are pressure sensitive such that the plurality of side openings are closed until a pressure of fluid in the fluid path of the first fluid conduit exceeds a predetermined pressure.

19. The method of claim 17, wherein a distal end of the second fluid conduit is connected to a proximal end of the hose, and a proximal end of the second fluid conduit is connected to the fluid reservoir.

20. The method of claim 17, wherein the fluid includes AUS32.

* * * * *